(12) United States Patent
Olson, III (10) Patent No.: US 11,685,690 B2
(45) Date of Patent: Jun. 27, 2023

(54) VITREOUS CARBON AGGREGATE FOR LIGHTWEIGHT CONCRETE

(71) Applicant: CFOAM, LLC, Triadelphia, WV (US)

(72) Inventor: Rudolph A. Olson, III, Triadelphia, WV (US)

(73) Assignee: CFOAM LLC, Triadelphia, WV (US)

( * ) Notice: Subject to any disclaimer, the term of this patent is extended or adjusted under 35 U.S.C. 154(b) by 0 days.

(21) Appl. No.: 17/920,986

(22) PCT Filed: May 12, 2021

(86) PCT No.: PCT/US2021/031897
§ 371 (c)(1),
(2) Date: Oct. 24, 2022

(87) PCT Pub. No.: WO2021/231515
PCT Pub. Date: Nov. 18, 2021

(65) Prior Publication Data
US 2023/0135210 A1  May 4, 2023

Related U.S. Application Data

(60) Provisional application No. 63/025,235, filed on May 15, 2020.

(51) Int. Cl.
*C04B 20/00* (2006.01)
*C04B 20/02* (2006.01)
(Continued)

(52) U.S. Cl.
CPC ...... *C04B 20/0008* (2013.01); *B29C 44/3403* (2013.01); *C04B 20/026* (2013.01); *C04B 20/04* (2013.01); *C04B 20/1029* (2013.01); *C04B 20/1088* (2013.01); *C04B 40/04* (2013.01); *E04C 5/073* (2013.01)

(58) Field of Classification Search
CPC .............. B29C 65/486; B29C 65/4865; B29C 65/4875; B29C 33/54; B29C 66/7444; B29C 65/3492; B29C 66/72323; B29C 67/248; B29C 67/242; C04B 35/62695; C04B 35/6267; C04B 38/068; C04B 18/085; C04B 18/084
See application file for complete search history.

(56) References Cited

U.S. PATENT DOCUMENTS 3,421,991 A  1/1969 Hildebrandt
3,626,149 A  12/1971 Carney et al.
(Continued)

FOREIGN PATENT DOCUMENTS

CN  110606713 A  12/2019
KR  101870332 B1  6/1998
KR  20110109706 A  10/2011

OTHER PUBLICATIONS

Mesh to Micron Conversion Chart; retrieved from internet on Jun. 10, 2022.
(Continued)

*Primary Examiner* — Stella K Yi
(74) *Attorney, Agent, or Firm* — Kirk A. Wilson; Joseph T. Guy; Patent Filing Specialist Inc.

(57) ABSTRACT

A method for making a low cost, lightweight carbon aggregate from coal at, above, or below atmospheric pressure, and a lightweight concrete composition utilizing the lightweight carbon aggregate is described.

11 Claims, 6 Drawing Sheets

(51) Int. Cl.
*C04B 20/04* (2006.01)
*C04B 40/04* (2006.01)
*C04B 20/10* (2006.01)
*E04C 5/07* (2006.01)
*B29C 44/34* (2006.01)

(56) References Cited

U.S. PATENT DOCUMENTS

| | | |
|---|---|---|
| 4,764,218 A | 8/1988 | Kobayashi et al. |
| 5,685,902 A | 11/1997 | Tezuka et al. |
| 5,772,751 A | 6/1998 | Nisnevich |
| 6,869,455 B2 | 3/2005 | Rogers et al. |
| 7,862,897 B2 | 1/2011 | Whitmarsh |
| 2016/0010017 A1 | 1/2016 | Scalzo et al. |

OTHER PUBLICATIONS

Niyazi Ugur Kockal, Turan Ozturan; Strength and Elastic Properties of Structural Lightweight Concretes; Materials and Design; vol. 32, Issue 4, 2011; pp. 2396-2403.
ISA/US; International Search Report and Written Opinion prepared for PCT/US2021/031897; dated Sep. 24, 2021.
ISA/US; International Preliminary Report on Patentability prepared for PCT/US2021/031897; dated Jul. 7, 2022.

| mesh split | bulk density (pcf) | apparent density (pcf) | packing efficiency (%) |
|---|---|---|---|
| +1/2" | 30.5 | 58.1 | 53% |
| -1/2" / +1/4" | 36.3 | 68.5 | 53% |
| -1/4" / +8 mesh | 42.1 | 79.5 | 53% |

| COMPONENT | weight (lbs/cy) | Specific Gravity | Density (pcf) | Volume (cf/cy) | Volume (%) | Weight (%) | Weight (lbs) |
|---|---|---|---|---|---|---|---|
| cement | 930.4 | 3.15 | 196.6 | 4.73 | 17.5 | 38.7 | 3.86 |
| water | 333.1 | 1 | 62.4 | 5.34 | 19.7 | 13.9 | 1.38 |
| fine aggregate | 495.0 | 1.29 | 80.5 | 6.15 | 22.7 | 20.6 | 2.05 |
| coarse aggregate | 642.8 | 1.11 | 69.3 | 9.28 | 34.3 | 26.7 | 2.66 |
| air (estimate) | 0 | 0 | 0 | 1.5 | 5.5 | 0.0 | 0.00 |
| HRWR | 2.1 | 1.1 | 68.64 | 0.03 | 0.1 | 0.1 | 0.01 |
| Total | 2403.3 | | | 27.0 | 100.0 | 100.0 | 10.0 |

| | |
|---|---|
| Average Density of Concrete (pcf) | 91 |
| Average Tensile Strength (psi) | 328 |

| | |
|---|---|
| density (pcf) | 92 |
| compressive stress (psi) | >2830 |

| ABSOLUTE VOLUMES (cf/cy) | |
|---|---|
| paste (water + cement) | 10.1 |
| total aggregate (coarse + fine) | 15.4 |
| mortar (paste + air + fines) | 17.7 |
| VOLUME RATIO | |
| paste/total (%) | 37.3 |
| mortar/total (%) | 65.6 |
| water/paste (%) | 53.0 |
| air/paste (%) | 14.9 |
| WEIGHT RATIO | |
| water/cement | 0.36 |

Fig. 6

Typical Properties for Lightweight Concrete

<u>Structural Lightweight Concrete</u>
- Density (pcf) 85-115
- Compressive strength (psi) 3600-5800

<u>Moderate Strength Lightweight Concrete</u>
- Density (pcf) 50-120
- Compressive strength (psi) 1000-2500

Fig. 7

VITREOUS CARBON AGGREGATE FOR LIGHTWEIGHT CONCRETE

CROSS-REFERENCE TO RELATED APPLICATIONS

The present invention claims priority to U.S. Provisional Patent Application No. 63/025,235, filed May 15, 2020, incorporated herein by reference in its entirety.

FIELD OF THE DISCLOSURE

The present invention is directed to a method for producing a lightweight vitreous carbon aggregate from coal, and a concrete composition made from the aggregate. The method can be done at atmospheric pressure, above atmospheric pressure, or below atmospheric pressure.

BACKGROUND OF THE DISCLOSURE

About 10 billion tons of concrete is produced every year, which is more than one ton per person on the planet; it is the second most used material next to water. Approximately 70% of the volume of concrete is composed of aggregate, which puts the usage volumes of aggregate on the scale of billions of tons per year.

Concrete makes up a large part of the infrastructure of the United States, which is under considerable strain. Improved concrete designs that enhance the life of structures that make up our infrastructure are required. The spectrum of concrete products is quite broad and a wide variety of designs exist. One efficient and well-engineered product is Structural Lightweight Concrete, which is a material that uses lightweight aggregate to achieve certain property improvements over those of heavier, more conventional concrete designs. Examples include better thermal properties, better fire ratings, reduced autogenous shrinkage, excellent freezing and thawing durability, improved contact zone between aggregate and cement matrix, less micro-cracking as a result of better elastic compatibility, more blast resistance, better shock and sound absorption, less cracking, improved skid resistance, and easier placement via concrete pumping. Examples of specific applications include heat insulation on roofs, insulating water pipes, construction of partition walls and panel walls in frame structures, general insulation of walls, and surface rendered for external walls of small houses.

Aggregates, which are essential ingredients of concrete, may be derived from natural sources with minimal processing or from naturally occurring materials that are heat treated. Aggregates may also be synthetic. Aggregates from natural sources, such as quarries, pits in ground, and riverbeds, for example, are generally composed of rock fragments, gravel, stone, and sand, which may be crushed, washed, and sized for use, as needed. Natural materials that may be used to form aggregates include clay, shale, and slate, which are pyroprocessed, causing expansion of the material. OPTIROC and LECA are examples of commercially available expanded clay aggregates, for example. Synthetic aggregates may comprise industrial byproducts, which may be waste materials. LYTAG, for example, is a commercially available sintered aggregate comprising pulverized fuel ash ("PFA"), also known as fly ash. PFA is the residual particulate oxide material left over from the combustion of coal in power plants, for example.

Aggregates may be lightweight or normal weight. Lightweight aggregates ("LWAs") have a particle density of less than 2.0 g/cm$^3$ or a dry loose bulk density of less than 1.1 g/cm$^3$, as defined in ASTM specification C330. Normal weight aggregates from gravel, sand, and crushed stone, for example, generally have bulk specific gravities of from about 2.4 to about 2.9 g/cm$^3$ (both oven-dry and saturated-surface-dry), and bulk densities of up to about 1.7 g/cm$^3$. High quality LWAs have a strong, but low density and porous core of uniform structural strength. LWAs may also have a dense, continuous, relatively impermeable surface layer to inhibit water absorption. They are physically stable, durable, and environmentally inert. LWAs may be designed to have a nearly spherical shape to improve the rheology and flow of fresh concrete, or more angular shape to provide better strength after the concrete is properly compacted. The surface of the LWA should also provide good adherence to concrete paste. Suitable sizes for incorporation in concrete range from about 0.5 to 25 mm, depending on the application, or 2.36 mm to 9.5 mm for coarse aggregates, in accordance with ASTM Specification C330. Smaller, fine aggregates, which are a byproduct of LWA production, may also be used, to replace sand in concrete, for example. For use in concrete, LWAs should have a sufficient crushing strength and resistance to fragmentation so that the resulting concrete has a strength of greater than 10 MPa and a dry density in a range of about 1.5 g/cm$^3$ to about 2.0 g/cm$^3$. Concrete containing LWAs ("LWA concrete") may also have a density as low as about 300 kg/m$^3$.

While LWA concrete may be 20-30% lighter than conventional concrete, it may be just as strong. Even when it is not as strong as conventional concrete, the LWA concrete may have reduced structural dead loads enabling the use of longer spans, narrower cross-sections, and reduced reinforcement in structures. The lower weight of the LWA concrete facilitates handling and reduces transport, equipment, and manpower costs. LWA concrete may be particularly useful in construction slabs in high rise buildings and in concrete arch bridges, for example. LWA concrete may also have improved insulating properties, freeze-thaw performance, fire resistance, and sound reduction. LWAs can also be used in the construction of other structures, in highways, and as soil fillers, for example.

Quarrying is the largest source of aggregates by volume in most countries. Despite the many advantages of LWAs, aggregate extraction is complicated by environmental and legal issues, availability, and transportation and other costs, for example.

One important additional property of lightweight aggregate is its ability to hold water, which enables internal curing, a process by which the hydration of cement on the inside of the concrete can continue at later times using water that is not a part of the original mixing water, ultimately achieving a greater extent of hydration and improved properties. The goal of internal curing is to maximize hydration, essentially insure as much of the reactants as possible are converted to hydrates, and minimize self-desiccation when low water-to-cement ratios are utilized, which in turn minimizes the accompanying stresses that may produce early-age cracking. An important point when utilizing internal curing is that the water within the aggregate must not release early and combine with the mix water of the fresh concrete, else the water-to-cement ratio of the product will be adversely affected.

The lightweight aggregate used in a concrete design must be engineered to manage: 1) the amount of internal curing water introduced to the concrete after set, 2) the location of curing water in the matrix, and 3) the proper sizes of aggregates to meet the overall particle size demands of the mix design. Internal curing has been employed in a variety of concrete mixtures for diverse applications including bridge decks, pavements, transit yards, and water tanks; hundreds of thousands of cubic meters have been successfully placed throughout the U.S.

The water content of lightweight aggregates such as pumice, expanded clay, or expanded shale can be difficult to manage. Water readily wets the material and can easily flow into and out of the aggregate. Thus, piles of aggregate must be constantly monitored and maintained with water sprinklers and turned regularly using large equipment. Variation in water content can impact the water-to-cement ratio of the concrete mix, thereby adversely impacting properties. Water permeating through the concrete microstructure after hardening will tend to flow easily through any open porosity within the aggregate.

Given all these materials contain silica, there is potential for damage through alkali silica reaction.

Pumice has a very low density, but can be highly irregular in shape, very friable, and the distribution of particles can be highly variable. It tends to breakdown during the concrete mixing process, changing the overall particle size distribution.

Prior art methods and materials use fly ash (or coal ash) to make their aggregate. This is primarily the oxides left over from burning coal (mixture of clay, quartz, glass, etc.). Sometimes, a blowing agent is used to reduce density, and obtain a low density, oxide based aggregate.

BRIEF SUMMARY OF THE INVENTION

A method of producing a lightweight aggregate can follow the steps of; pulverizing coal into a fine coal powder; blending the fine coal powder and at least one additive to form a coal mixture; pelletizing the coal mixture using a binder to make coal aggregate comprising fine aggregates and course aggregates; foaming the coal aggregate by heating to a temperature between 250° C. and 500° C. under an inert gas; and pyroprocessing the coal aggregate to a temperature between 750° C. and 1240° C. under an inert gas to form a vitreous lightweight aggregate having an apparent density of less than 85 pounds per cubic foot.

A lightweight carbon aggregate concrete composition can comprise between 15-50 wt % cementitious materials that will react with water, such as Portland cement, between 5-25 wt % water, a lightweight carbon aggregate comprising between 10-30 wt % fine aggregate and between 15-35 wt % course aggregate, between 0-0.4 wt % high-range water reducer. The cement reacts with the water to bind with the lightweight carbon aggregate and form a lightweight concrete.

DETAILED DESCRIPTION OF THE INVENTION

Some embodiments of the present invention are described in this section in detail sufficient for one skilled in the art to practice the present invention without undue experimentation. It is to be understood, however, that the fact that a limited number of preferred embodiments are described does not in any way limit the scope of the present invention as set forth in the claims.

It is to be understood that whenever a range of values is described herein, i.e. whether in this section or any other part of this patent document, the range includes the end points and every point there between as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

Coal can be used to create a vitreous carbon aggregate when fired to high temperatures in the absence of oxygen. In the process, the coal is first pulverized and then pelletized using binder in either a fluidized bed or a drum (or pan) granulation process. The aggregates are then fired under an inert gas; the oxygen and hydrogen in the coal leave during the process, but the carbon remains behind, continuing to crosslink and densify. Gases that evolve from the coal during the thermal processing at a point when the coal is in a partial molten state can create stable bubbles in the structure, forming a carbon foam. If the reaction rate is controlled along with the amount of liquid phase formation and viscosity of that liquid, a porous, relatively strong, vitreous carbon aggregate is produced. Thus, the aggregate size can be controlled through the forming process and the aggregate porosity can be controlled by varying the type of coal used and managing reaction rates and liquid formation in the firing process. This novel product has certain properties that set it apart from other conventional, low density aggregates: 1) the density of solid vitreous carbon can be only 1.6 g/cm³. This is much lighter than the density of more common silicates and aluminosilicates that make up expanded clay, shale and pumice, which are closer to 2.6 g/cm³, 2) the vitreous carbon is quite strong and has good resistance to friability, unlike some of the weaker and more irregularly shaped aggregates like pumice, 3) any danger of alkali silica reaction is eliminated given its composition is primarily carbon, 4) selection of aggregate size for a given mix design could be easily provided through its forming process, thus, internal curing water can be delivered at the desired location and scale throughout the concrete microstructure, and 5) vitreous carbon is relatively non-wetting to water (wetting angle close to 90°), whereas all other conventional lightweight aggregates are wetting. This could provide several advantages such as: a) once water is forced into the structure under light hydraulic pressure, it would not tend to leach out before use, i.e. water would tend to exist as disconnected pockets within the pore structure. With conventional aggregate, piles of lightweight aggregate must be constantly watered and turned, as the aggregate on the bottom of the piles tend to carry more water than those on the top due to flow of water and drainage; b) the permeability of lightweight concrete made with carbon aggregate would tend to be less given water would be inhibited from flowing through the aggregate, unlike most aluminosilicate based aggregates; c) water for internal curing would tend to migrate from the carbon aggregate at later times, which would benefit cement hydration at longer times; d) chemicals carried by water infused into carbon aggregate would be released over longer time periods, thus, reactants that could reduce permeability, such as viscosity enhancing or crack healing agents, may show improved performance; and e) drying shrinkage would be reduced given the menisci in fine pores within the aggregate would not convey stresses on the matrix.

Target aggregate sizes can range from less than 0.5 mm to over 10 mm in diameter. Some functions similar to those above might also be attained in asphalt-based products, proppants, fillers for plastics, and carbon-bearing magnesia refractories designed for improved resistance to slag attack and thermal shock resistance in steel processing applications. Coal, which is primarily a mixture of organic polymers, can be converted to lightweight vitreous carbon aggregates at atmospheric pressure using the methods of the instant invention. The method can be done at atmospheric pressure, above atmospheric pressure, or below atmospheric pressure.

Densities can be similar to many other lightweight aggregates, however, lightweight carbon aggregates mixtures made from coal, herein referred to as a coal mixture, are newly taught with noted benefits.

The starting material coal may include bitumen, anthracite, or even lignite, or blends of these coals that exhibit a "free swell index" as determined by ASTM D720 of between about 3.5 and about 5.0, but are preferably bituminous, agglomerating coals that have been comminuted to an appropriate particle size, preferably to a fine powder below about −60 to −80 mesh. Additionally, according to further highly preferred embodiments of the present invention, the coal starting materials of the present invention possess all or at least some of the following characteristics: 1) a volatile matter content (dry, ash-free basis) of between about 35% and about 45% as defined by ASTM D3175, "Test Method for Volatile Matter in the Analysis of Coal and Coke"; 2) a fixed carbon (dry basis) between about 50% and about 60% as defined by ASTM D3172, "Practice for Proximate Analysis of Coal and Coke"; 3) a Gieseler initial softening temperature of between about 380° C. and about 400° C. as determined by ASTM D2639, "Test Method for Plastic Properties of Coal by the Constant-Torque Gieseler Plastometer"; 4) a plastic temperature range above about 50° C. as determined by ASTM D2639; 5) a maximum fluidity of at least 300 ddpm (dial divisions per minute) and preferably greater than about 2000 ddpm as determined by ASTM D2639; 6) expansion greater than about 20% and preferably greater than about 100% as determined by Arnu Dilatation; 7) vitrinite reflectance in the range of from about 0.80 to about 0.95 as determined by ASTM D2798, "Test Method for Microscopical Determination of the Reflectance of Vitrinite in Polished Specimens of Coal"; 8) less than about 30% inert maceral material such as semifusinite, micrinite, fusinite, and mineral matter as determined by ASTM D2798; and 9) no significant oxidation of the coal (0.0 vol % moderate or severe oxidation) as determined by ASTM D2798 and non-maceral analysis. The low softening point (380-400° C.) is important so that the material softens and is plastic before volatilization and coking occur. The large plastic working range or "plastic range" is important in that it allows the coal to flow plastically while losing mass due to volatilization and coking. Vitrinite reflectance, fixed carbon content and volatile matter content are important in classifying these coal starting materials as "high-volatile" bituminous coals that provide optimum results in the process of the present invention.

Figure 1:
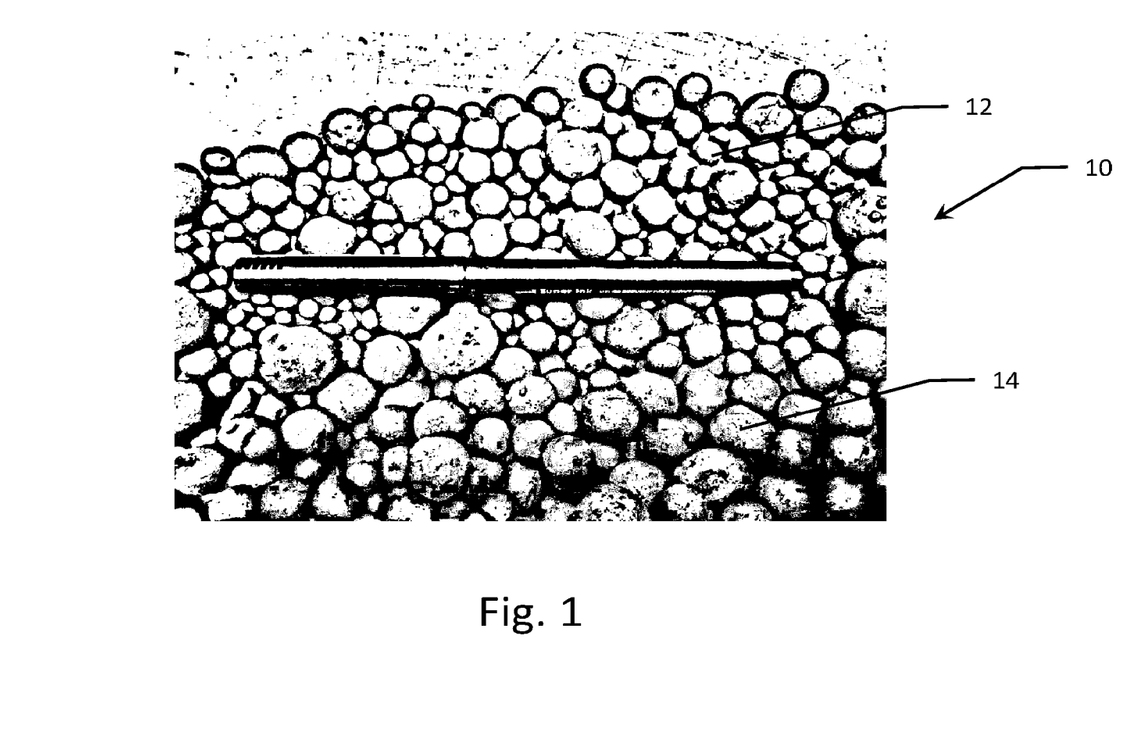
FIG. 1 is a photograph of a pelletized coal mixture of fine aggregates and course aggregates.
Figure 2:
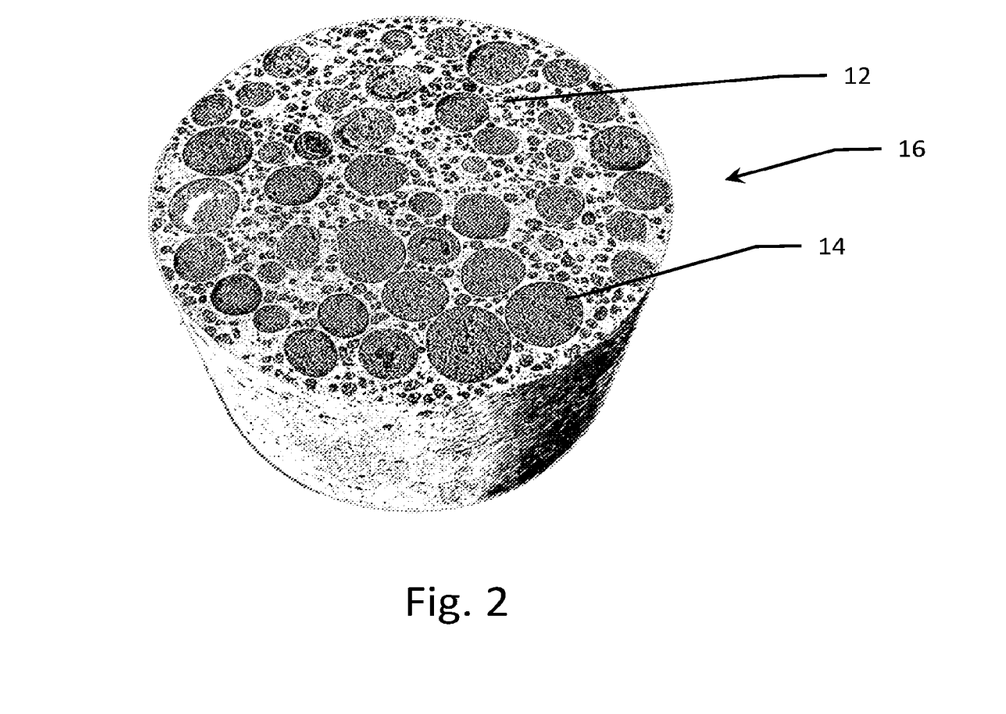
FIG. 2 is a photograph of a cross-section of concrete containing lightweight carbon aggregate of the instant invention.

FIG. 1 is a photograph of a pelletized coal mixture 10 of fine aggregates 12 and course aggregates 14. Aggregate sizes can vary depending on predetermined properties. FIG. 2 is a photograph of a cross-section of lightweight concrete 16 containing lightweight carbon aggregate of the instant invention. Fine aggregate 12 and course aggregate 14 are set in the lightweight concrete 16 photograph.

Figure 3:
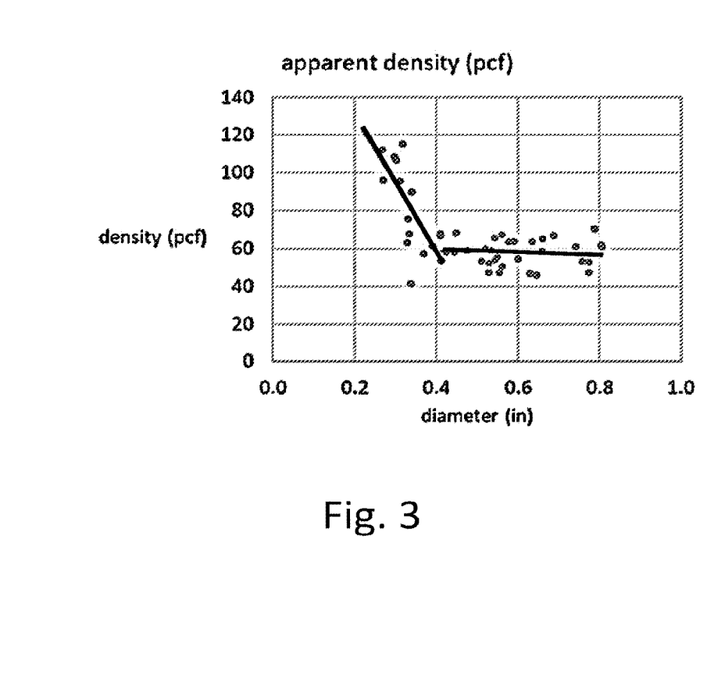
FIG. 3 is a graph of apparent density of rounded individual carbon aggregates vs. pelletized aggregate diameter.
Figure 4:
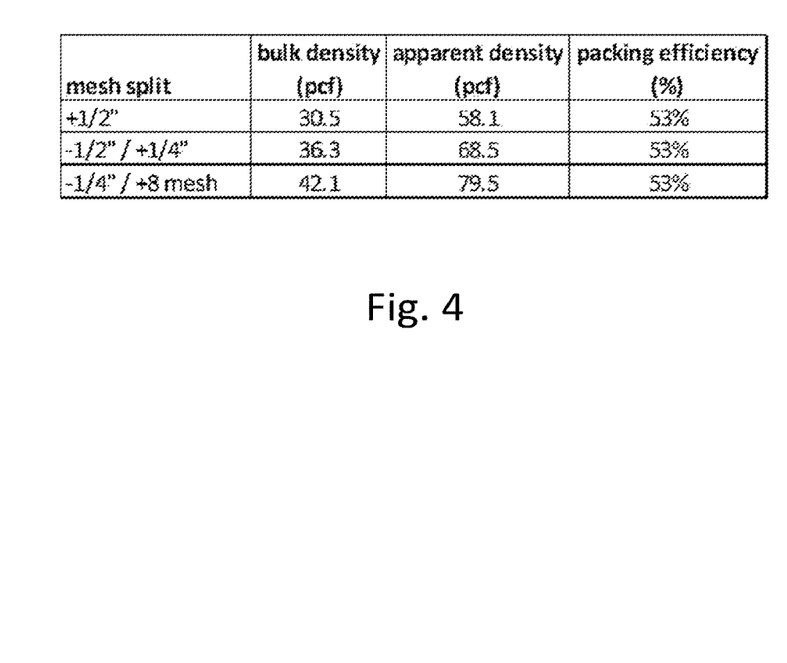
FIG. 4 is a table of densities for various mesh splits of pelletized carbon aggregate.
Figure 5:
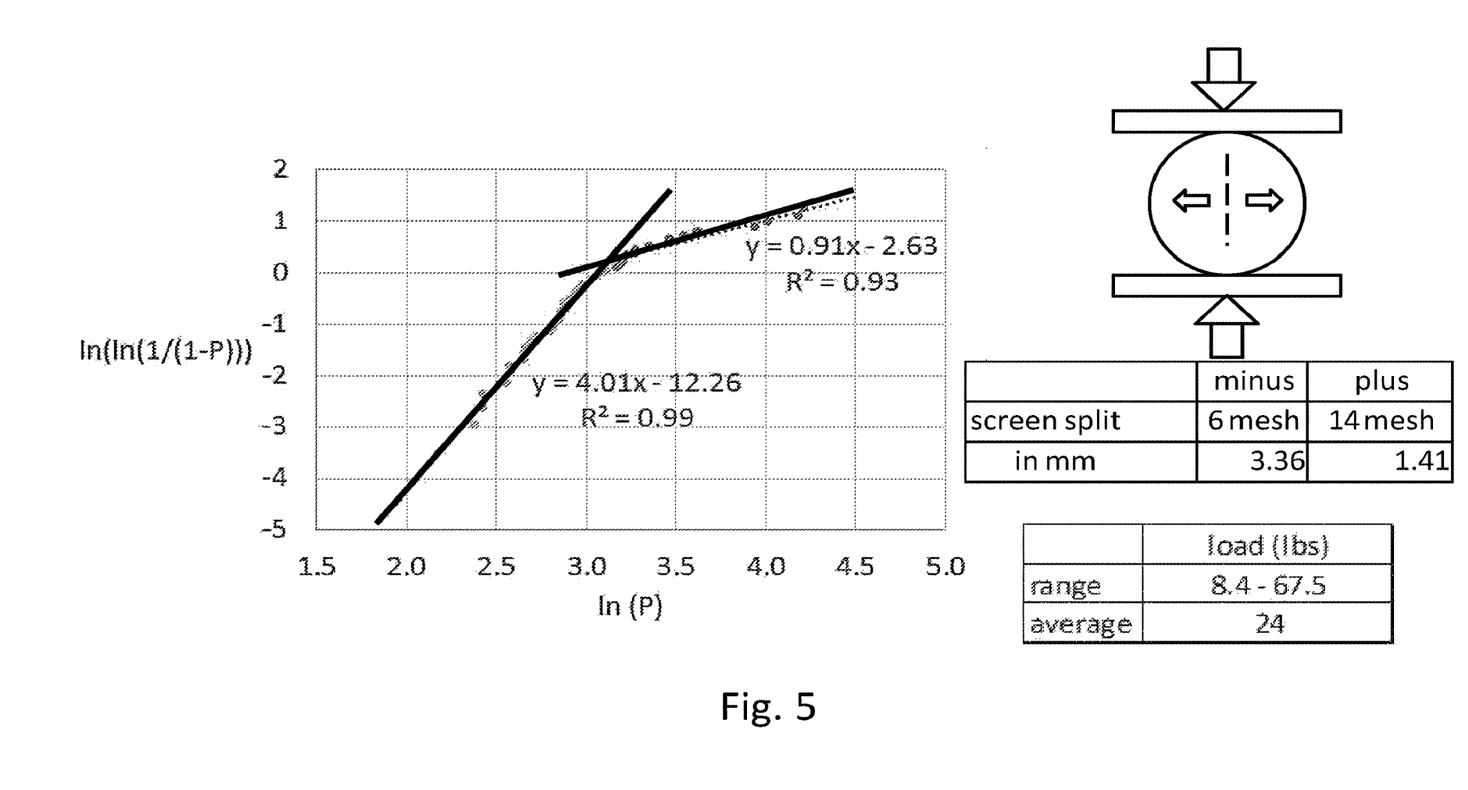
FIG. 5 is a Weibull analysis demonstrating the strength behavior of carbon aggregate.

FIG. 3 is a graph of carbon aggregate apparent density vs. pelletized aggregate diameter. As seen in FIG. 3, a significant increase in apparent density occurs at a pelletized aggregate diameter of below about 0.4 inches. FIG. 4 is a table of densities for various mesh splits of pelletized aggregate. FIG. 5 is a Weibull analysis demonstrating the strength behavior of carbon aggregate (pellet) in a diametral compression test. The compression test results indicate a failure mode change at about 24 pounds weight (shown as lbs in the table and P in the chart), which corresponds to ln(P) of about 3.2 on the horizontal (X) axis. This data can be used to avoid certain aggregate failure modes in concrete compositions made from the aggregate.

Figure 6:
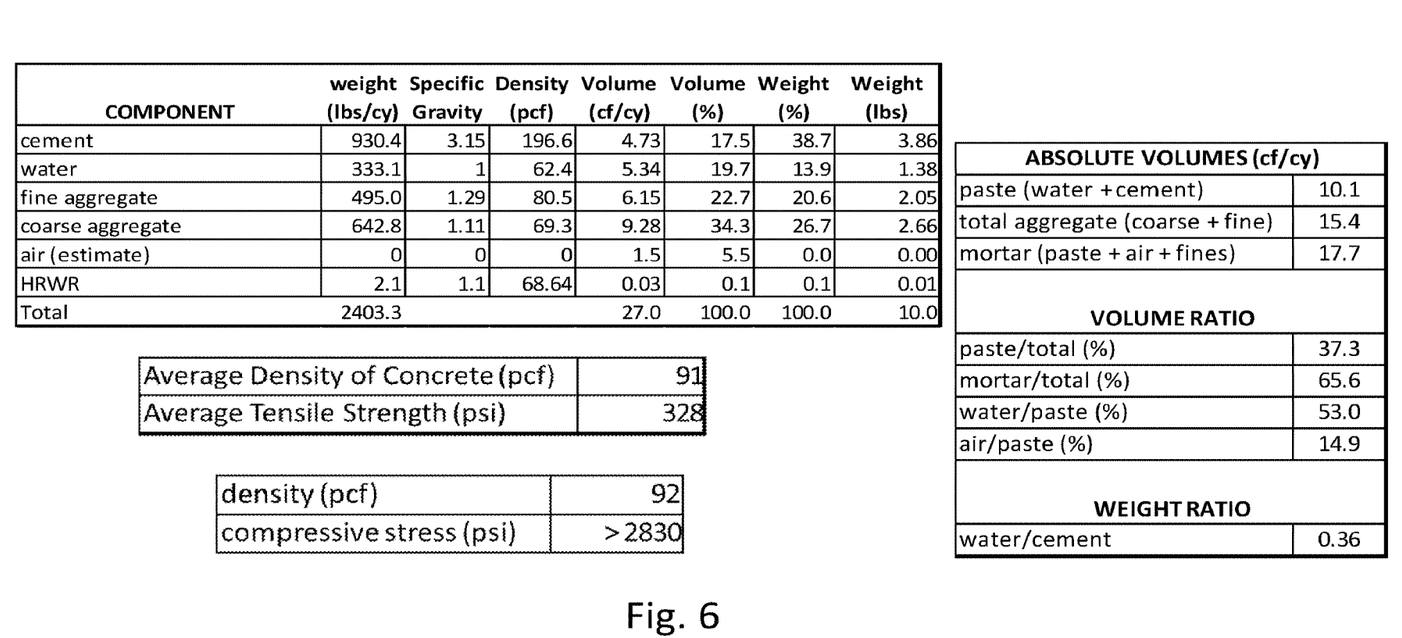
FIG. 6 is selected properties of a lightweight aggregate concrete composition example using the instant invention.
Figure 7:
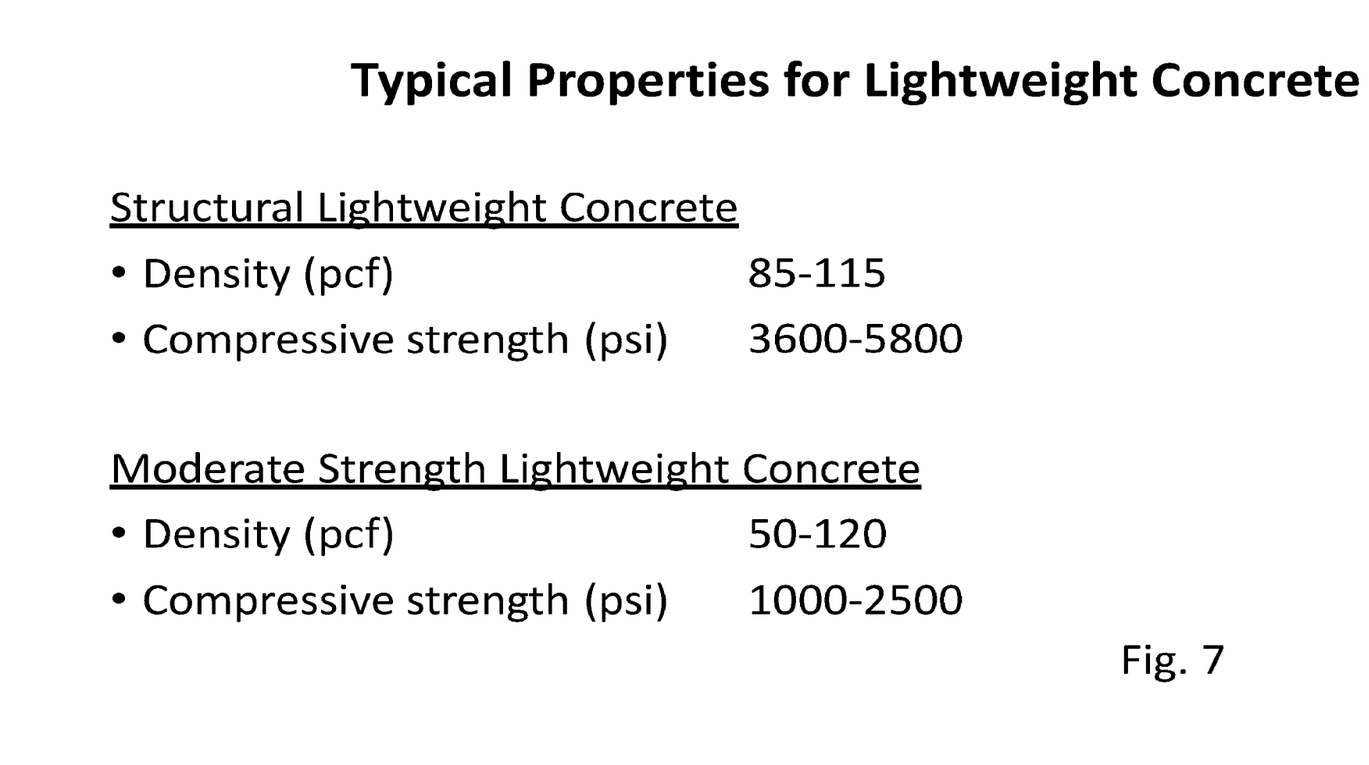
FIG. 7 illustrates typical properties for structural and moderate strength lightweight concrete.

FIG. 6 is selected properties of a lightweight aggregate concrete composition example using the instant invention. FIG. 7 illustrates typical properties for structural and moderate strength lightweight concrete.

A lightweight aggregate can be produced with the following steps; pulverizing coal into a fine coal powder; blending the fine coal powder and at least one additive to form a coal mixture; pelletizing the coal mixture using a binder to make coal aggregate comprising fine aggregates and course aggregates; foaming the coal aggregate by heating to a temperature between 250° C. and 500° C. under an inert gas, such as nitrogen, at atmospheric pressure; and pyroprocessing the coal aggregate to a temperature between 750° C. and 1240° C. under an inert gas, such as nitrogen, at atmospheric pressure to form a vitreous lightweight aggregate having an apparent density of less than 85 pounds per cubic foot. The coal mixture can contain bituminous, subbituminous, anthracitic, lignitic, and combinations of coal thereof. The coal aggregate can be formed in a granulator or fluidized bed. Any of the method steps can be done at atmospheric pressure, above atmospheric pressure, or below atmospheric pressure.

The foaming step can further comprise adding a particulate pore stabilizer to the coal aggregate, wherein the particulate pore stabilizer can be carbon black, fine oxides of alumina, silica, boric acid, titania, aluminosilicate clay, kyanite, fine non-oxide powders of silicon carbide, metal powders, and mixtures thereof. An additional step can be performed in sintering the coal aggregate to form a sintered lightweight carbon aggregate. Also, an additional step of pyroprocessing the coal aggregate to cause volatilization and entrapment of volatized gases in a melted liquid phase at atmospheric pressure can be performed. The at least one additive can be at least one polymeric additive.

The blending step can further adjust the addition of the at least one additive to influence at least one of the amount of liquid formed in the coal mixture at a given time, the viscosity of the liquid formed in the coal mixture, the rate at which the at least one additive reacts, and cross-link in the coal mixture to form a solid.

The non-wetting behavior of the carbon aggregate can inhibit the release of water from the aggregate during concrete mixing, which in turn can enable the release of water to unreacted cement in the concrete matrix over a longer period of time, wherein internal curing is enabled.

The lightweight carbon aggregate can be first infused with water to enhance internal curing of the concrete at late hydration times without significantly affecting the mix water content at early stages. The at least one additive can be water infused into the aggregate, further having reactants to alter the cementitious hydration products, shrinkage cracking inhibitors, viscosity enhancers, crack-healing agents, carbonation agents, and mixtures thereof.

A concrete composition produced by the methods taught herein can include mixing the lightweight carbon aggregate with water, and given the non-wetting properties of the vitreous carbon, inhibit the release of the water during the concrete mixing step. The water within the carbon aggregate is then slowly released over a much longer period of time thereby providing internal curing. Another concrete composition is wherein the lightweight aggregate is first filled with water and other additives that can be released over a much longer period of time to improve the properties of the concrete, such as reactants that can alter the cementitious hydration products to improve permeability or strength, shrinkage cracking inhibitors, viscosity enhancers to reduce permeability, crack-healing agents, carbonation agents, or similar.

An example lightweight carbon aggregate concrete composition can comprise between 15-50 wt % of cementitious materials, such as Portland cement, between 5-25 wt % water, a lightweight carbon aggregate comprising between 10-30 wt % fine aggregate and between 15-35 wt % course aggregate, between 0-0.4 wt % high-range water reducer. The cement reacts with the water to bind with the lightweight carbon aggregate and form a lightweight concrete.

The lightweight carbon aggregate can be formed from a mixture of bitumen, anthracite, lignite, and combinations of coal thereof. The concrete composition can comprise a fine aggregate that is less than 8 mesh size. Also, the fine aggregate can have a bulk density of between 35-45 pounds per cubic foot and an apparent density of between 75-85 pounds per cubic foot. The coarse aggregate can be between 0.25-1 inches in diameter and have a bulk density of between 25-35 pounds per cubic foot and an apparent density of between 55-65 pounds per cubic foot.

The concrete composition can have a compressive strength of at least 1000 psi after 28 days, and a tensile strength of at least 100 psi with an average density of between 85-115 pounds per cubic foot. The concrete composition can further comprise fly ash, hollow fly ash, ground granulated blast furnace slag, metakaolin, silica fume, other mineral admixtures, and combinations thereof. The cement in the concrete can react with water to set and harden the concrete to form pavement, architectural structure, foundation, motorway/road, overpass, parking structure, brick, block, wall, footing for gate, fence and pole, bridge, foundation, levee, dam, manufactured stone veneer, and combinations thereof.

The lightweight carbon aggregate can also have a non-wetting characteristic configured to reduce the permeability and drying shrinkage of the lightweight carbon aggregate concrete. The concrete composition can further comprise graphite configured to increase the electrical conductivity and thermal conductivity of the lightweight carbon aggregate. The electrical conductivity of lightweight carbon aggregate made from coal can be varied over several orders of magnitude by processing to different temperatures or incorporating or inducing the formation of graphite in the aggregate. Carbon aggregate will also not passivate and form a low conductivity oxide coating in the cement matrix like metals. This can improve concrete performance characteristics such as grounding, protection against lightning, eliminating static electricity, environmental heating, and radio frequency interference screening.

The thermal conductivity of lightweight carbon aggregate made from coal can be increased by as much as a couple orders of magnitude (0.2 W/m-K to as much as 20 W/m-K) by incorporating or inducing the formation of graphite in the aggregate. This property might benefit the performance of concrete by limiting the thermal stresses that may form across the concrete due to thermal gradients, or accelerating deicing through the ability to transport heat to the surface of the concrete more quickly.

The cement in the concrete composition can react with water to set and harden the concrete to form pavement, architectural structure, foundation, motorway/road, overpass, parking structure, brick, block, wall, footing for gate, fence and pole, bridge, foundation, levee, dam, manufactured stone veneer, or combinations thereof. The permeability and drying shrinkage of the concrete can be reduced by the non-wetting characteristic of the vitreous carbon aggregate.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

The invention claimed is:

1. A method for producing a lightweight carbon aggregate, comprising:
   pulverizing coal into a fine coal powder;
   blending the fine coal powder and at least one additive to form a coal mixture;
   pelletizing the coal mixture using a binder to make coal aggregate comprising fine aggregates and course aggregates;
   foaming the coal aggregate to cause volatilization and entrapment of volatized gases in a melted liquid phase at atmospheric pressure by heating to a temperature between 250° C. and 500° C. under an inert gas; and
   pyroprocessing the coal aggregate to a temperature between 750° C. and 1240° C. under an inert gas to form a vitreous lightweight aggregate having an apparent density of less than 85 pounds per cubic foot.

2. The method of claim 1, wherein the coal mixture comprises bituminous, subbituminous, anthracitic, lignitic, and combinations thereof.

3. The method of claim 1, wherein the coal aggregate is formed in a granulator or fluidized bed.

4. The method of claim 1, wherein the foaming step further comprises, adding a particulate pore stabilizer to the coal aggregate.

5. The method of claim 4, wherein the particulate pore stabilizer comprises carbon black, fine oxides of alumina, silica, boric acid, titania, aluminosilicate clay, kyanite, fine non-oxide powders of silicon carbide, metal powders, and mixtures thereof.

6. The method of claim 1, further comprising; sintering the coal aggregate to form a sintered lightweight carbon aggregate.

7. The method of claim 1, wherein the at least one additive comprises at least one polymeric additive.

8. The method of claim 1, wherein the blending step further comprises; adjusting the addition of the at least one additive to influence at least one of the amount of liquid formed in the coal mixture at a given time, the viscosity of the liquid formed in the coal mixture, the rate at which the at least one additive reacts, and cross-link in the coal mixture to form a solid.

9. The method of claim 1, wherein the mixing step further comprises; inhibiting the release of water in the lightweight aggregate concrete over a longer period of time wherein internal curing is enabled.

10. The method of claim 1, wherein the lightweight carbon aggregate is first infused with water to enhance internal curing of the concrete at late hydration times without significantly affecting the mix water content at early stages.

11. The method of claim 1, wherein the at least one additive comprises water infused into the aggregate, and further comprises reactants to alter the cementitious hydration products, shrinkage cracking inhibitors, viscosity enhancers, crack-healing agents, carbonation agents, and mixtures thereof.

* * * * *